United States Patent [19]

Carrington et al.

[11] 4,425,844
[45] Jan. 17, 1984

[54] HOME PULSE COMPENSATION FOR MULTIPLE SPEED LINE PRINTER

[75] Inventors: James E. Carrington, Vestal; Michael D. Hryck, Endwell; Dean W. Skinner, Binghamton; Gerald R. Westcott, Endicott, all of N.Y.

[73] Assignee: International Business Machines Corporation, Armonk, N.Y.

[21] Appl. No.: 391,313

[22] Filed: Jun. 23, 1982

[51] Int. Cl.³ ............................................. B41J 1/18
[52] U.S. Cl. ............................... 101/93.14; 364/519; 364/900; 101/93.29; 371/67
[58] Field of Search ................... 101/93, 93.13, 93.14, 101/93.18, 93.21, 93.22, 93.29; 364/519, 900; 371/48, 67

[56] References Cited

U.S. PATENT DOCUMENTS

| | | | |
|---|---|---|---|
| 3,222,651 | 12/1965 | Fabiszewski et al. | 371/67 X |
| 3,604,906 | 9/1971 | Hunter et al. | 371/67 |
| 4,027,764 | 6/1977 | Kashio | 371/67 X |
| 4,037,216 | 7/1977 | Chang et al. | 101/93 X |
| 4,275,653 | 6/1981 | Bolcavage et al. | 101/93.14 |
| 4,335,460 | 6/1982 | Bolcavage et al. | 101/93 X |
| 4,376,411 | 3/1983 | Carrington et al. | 101/93.14 |

OTHER PUBLICATIONS

"Digital Correction of Hammer Firing Times", IBM Tech. Discl. Bulletin, vol. 14, No. 12, May 1972, pp. 3565-3566.
"Generating Print Subscan Signals Using a Multiple Magnetic Emitter Head for Steel Belt Printers", IBM Tech. Discl. Bulletin, vol. 22, No. 5, 10/79, 1938.

*Primary Examiner*—E. H. Eickholt
*Attorney, Agent, or Firm*—John S. Gasper

[57] ABSTRACT

The control system for a line printer includes compensation circuit means for electronically changing the timing of the reference or home pulse to compensate for changes in the speed of the type characters on a continuous type carrier. The compensation circuit includes a storage register, a counter and a comparison circuit for comparing the content of the storage register and the counter. The counter when activated by a reference pulse generated from a reference mark on the moving type carrier counts subscan pulses generated from timing marks moving with the type characters. The storage register, which is programmable, stores different numeric values dependent on the speed of the type carrier representing different numbers of subscan pulses to be counted by the counter means. The comparator circuit compares the numeric value in the register with the count registered in the counting means. When an equality is detected, the comparator circuit generates a modified reference or sync pulse which is applied to sync control circuitry which checks the character signal produced by the type position circuitry of the printer controls.

8 Claims, 10 Drawing Figures

HOME PULSE COMPENSATION FOR MULTIPLE SPEED LINE PRINTER

FIELD OF THE INVENTION

This invention relates to printing apparatus and particularly to a high speed on-the-fly line printer operable at multiple printing speeds.

BACKGROUND OF THE INVENTION

One well-known type of high speed band printer comprises a flexible endless type band supported by spaced drive pulleys adjacent a row of uniformly spaced print hammers at a print line. An electric motor drive rotates the drive pulleys so that the type band moves at a substantially constant speed depending on the desired printing speed relative to the row of print hammers. Type characters on the band are arranged in a single row and are uniformly spaced with a pitch differing from the spacing or pitch of the print hammers so that mutual alignments of the type characters and print hammers occur in scan and subscan sequences. An electronic print control which includes type position circuitry selectively operates the print hammers in timed relation with the motion of the print characters at the given band velocity to print characters at desired print locations of the print line. Timing signals for operating the type position circuitry to actuate the print hammers at the correct time are provided by a stationary timing transducer which senses timing marks movable with the type band. The timing marks are typically fixed directly on the band in a single row or track called an emitter track parallel with the row of type characters. The timing marks are fixed on the band at a known distance from each other and in a known relationship to the type of characters usually with the same spacing as the type characters. Thus the emitter or timing signals generated by the sense transducer represents scan signals useful by the print control for operating the type position circuitry for the purpose of indicating type characters available to be printed as well as for other timing functions.

To print correctly, the printing controls must operate in synchronism with the moving type characters. That is, the character signals generated by the type position circuitry must agree with the type characters as they are moving toward alignment with the print hammers selected to be actuated. One means for achieving synchronization of the print controls employs a reference transducer means which generates a home or reference signal when a reference character is at a predetermined location relative to a given print hammer. The reference transducer means generates the reference signal by sensing one or more reference marks indicative of the reference character and movable with the type characters and timing marks. The reference marks are usually fixed relative to or on the type band in a known relationship to a given timing mark sometimes called the true home timing mark at a known distance relative to the reference character, usually the first character of the type set. The reference transducer means is located to sense the reference mark and to generate a reference signal when the reference character is at a predetermined lead distance from a position of alignment with a given print hammer. The lead distance is dependent on the type band or type character speed and the hammer flight time actual or effective of the given hammer. The lead distance corresponds to the distance the reference character must travel at the type band speed in the given flight time interval in order to become aligned with the given print hammer at the instant of impact.

The means for achieving synchronization usually employs sync control circuitry activated by the reference signal which counts timing signals between reference signals and at reference signal time generates a sync control signal which is used to activate the print controls to initiate printing. Thereafter, the synchronization control operates at reference signal times for determining whether the type position position circuitry is generating a reference character signal. In the event the type position circuitry is not generating a reference character signal at reference pulse time a sync control pulse is generated for use to discontinue printing and or to indicate an error.

With such an arrangement, changing type speeds to enable the printer to be operated at plural different printing speeds to achieve printing at different print rates presents a problem. This is simply because of the fact that different lead distances are required for different type speeds where the flight time of the given hammer remains the same. One option for accomplishing lead distance change might be to physically change the position of the reference transducer. Another option is to change the position of the reference mark relative to the reference character. A third might be to provide multiple reference marks located at different distances relative to the reference character. A fourth option might be to replace the control circuitry to function for different reference characters. All of these options have serious drawbacks such as increased cost, structural complexity and opportunity for error upon operator intervention. In addition, none of the above options allow complete flexibility in the choice of speeds. This is due to the fact that the lead distance for certain speeds is at a position which is not equal to an integer number of timing or emitter marks.

The present invention avoids the above drawbacks, does not require require physical rearrangement or replacement of components for its complete flexibility in the choice of operating speeds.

BACKGROUND ART

U.S. Pat. No. 3,987,723 issued Oct. 26, 1976 to F. A. Mahoney et al discloses a line printer with type band having timing marks and a home mark sensed by a transducer at a read station. The transducer is shiftable to compensate for changes in hammer flight time resulting from changes in paper thickness.

Publication of V. V. Halich et al., IBM Technical Disclosure Bulletin Vol. 14, No. 11, April 1972, pgs. 3464-3465 discloses circuitry for advancing or delaying hammer firing to compensate for variations in speed of type train of a line printer caused by print hammer loading or power line deviation.

U.S. Pat. No. 3,974,765 issued Aug. 17, 1976 to A. F. Jossic discloses an endless belt line printer with sensor means for generating synchronizing and check pulses used for delaying hammer firing to compensate for variations in belt speed.

SUMMARY OF THE INVENTION

Basically the invention achieves the above as well as other objects by providing electronic means for compensating for changes in the lead distances for different character speeds. The compensation circuit is designed to change the timing of the reference pulse which is always generated for all speeds when the reference character is at a fixed lead distance from the given print hammer.

In the preferred embodiment, the lead distance corresponds to the distance the reference character must travel at the highest speed during the interval of the flight time of the given hammer so that the reference character is printable at the instant of alignment and the reference pulses are delayed when operating at all other speeds. The compensation circuitry which is programmable preferably comprises a counter for counting subscan pulses generated from timing marks moving with the type characters on an endless type carrier and a storage register. The storage register is electrically alterable to store different numeric values representing different numbers of subscan pulses to be counted by the counter means. The storage register which may be altered by an external electronic data processor is connected to a comparator circuitry which compares the numerical value in the register with the count registered in the counting means. When the comparator detects equality between the numeric value and the numeric count, it generates a modified reference or sync pulse which is applied to a sync control circuitry for checking the character signal produced by the type position circuitry.

With the compensation circuitry provided by the invention, it is not necessary to physically relocate the reference pulse transducer means. The speed changes can be made without operator interference and there is complete flexibility of choice in the speeds with which printing can take place without a requirement for redesigning or replacing mechanisms or controls.

The foregoing and other objects, features and advantages of the invention will be apparent from the following more particular description of the preferred embodiments of the invention, as illustrated in the accompanying drawings.

DETAILED DESCRIPTION OF THE INVENTION

Figure 1:
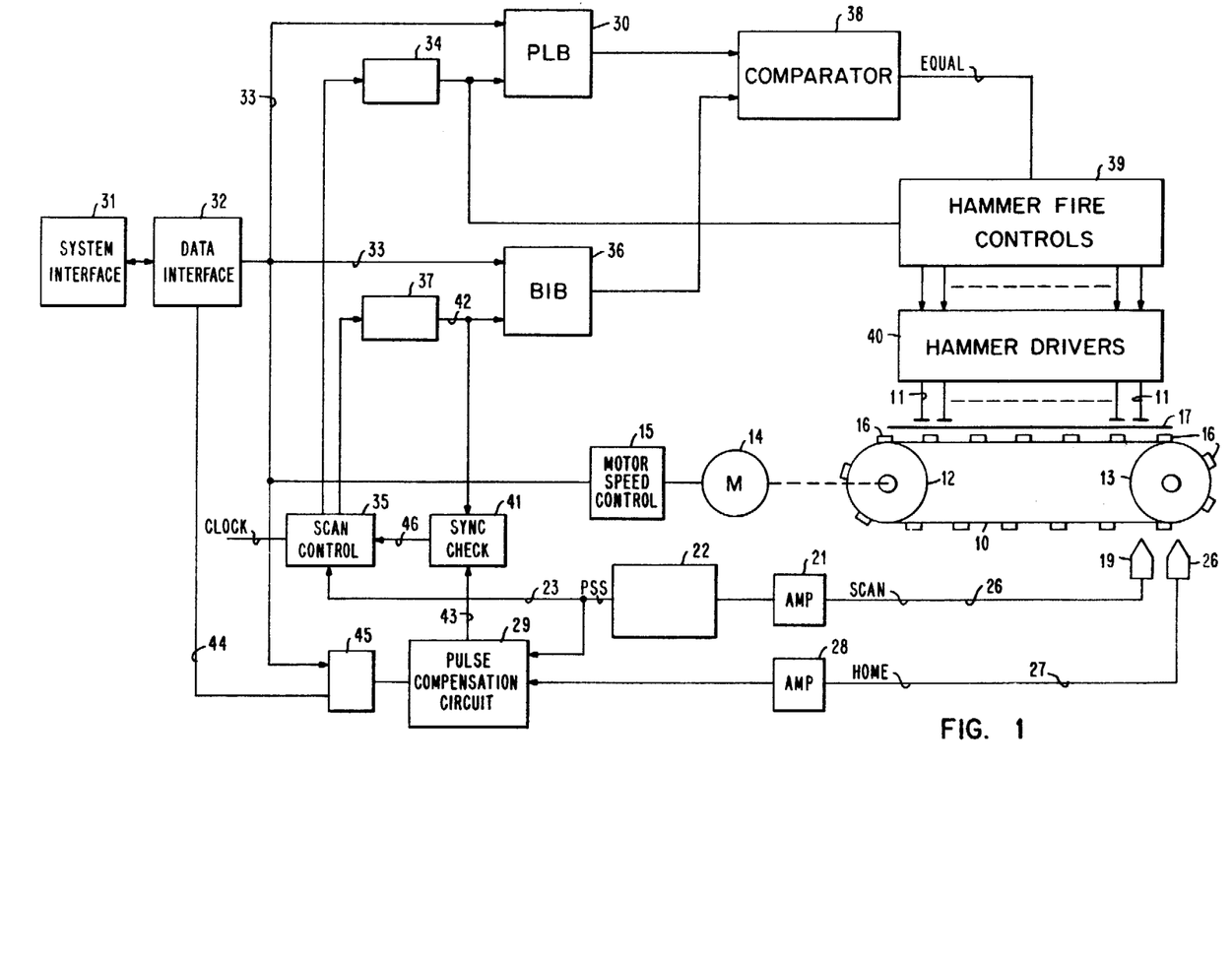
FIG. 1 is a general diagram of a printer system which incorporates the invention.
Figure 2:
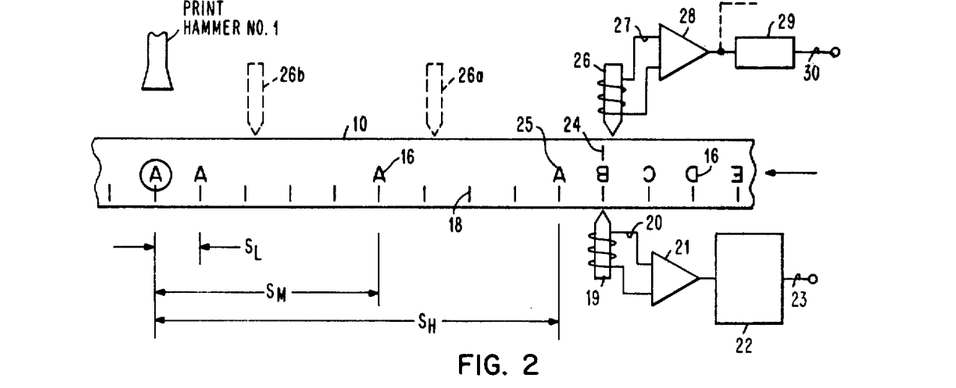
FIG. 2 is a schematic diagram showing a fragment of a type band and timing components for illustrating the invention.

As seen in the system diagram of FIG. 1, a line printer mechanism for practicing this invention comprises a continuous flexible metal type band 10 and a row of uniformly spaced electromagnetically operable print hammers 11 arranged in the vicinity of and parallel with a straight stretch of type band 10. Band 10 is supported by rotatable drive pulleys 12 and 13 one of which is connected to a drive motor 14 operable at plural speeds by a speed control 15 which maintains the band speed constant during the printing operation depending on the desired printing speeds selected. Motor 14 may be a DC motor of any well known type and band motor speed control may be a voltage regulator for applying selected DC voltages to control the operating speed of motor 14. Engraved type elements 16 such as characters or other graphic symbols are spaced uniformly around the band 10 but at a pitch which differs from the pitch of hammers 11. Due to this pitch differential, the type elements align as subgroups with subgroups of hammers 11 during band motion in accordance with a plurality of continuously recurring scan and subscan sequences. The scan/subscan principal of operation is well known and further detailed information can be obtained by reference to U.S. Pat. No. 4,275,653 issued June 30, 1981 to R. D. Bolcavage, et al. In a particular arrangement in which this invention is practiced, the print mechanism can have 168 print hammers for 168 print positions of a print line to be recorded on print medium 17 with the printed characters spaced 10 to the inch. The type band 10 may have 480 type elements 16 spaced 0.133 inches thereby providing four subscans per print scan. With this arrangement, a complete revolution of band 10 would break down to 480 scans and 1920 subscans. As seen in FIG. 2, band 10 has engraved timing marks 18 arranged in a row parallel with the characters 16. The timing marks 18 are equal in number with the type characters and have the same relative uniform spacing. Therefore, timing marks 18 are aligned with the type characters 16. A transducer 19 senses the timing marks 18 during motion and generates emitter or scan pulses on line 20 to an amplifier circuit 21. The scan pulses which are generated at the rate of one scan pulse per print scan are then passed through a frequency multiplier circuit such as a phase lock loop oscillator circuit 22 connected to amplifier circuit 21 which converts the scan pulses to subscan pulses at a frequency equal to the number of subscan alignments of type elements 16 with hammers 11. For the specific pitch differential already discussed, phase locked oscillator circuit 22 would generate four subscan pulses on line 23 for each scan pulse generated by transducer 19 in response to each timing mark 18 sensed on band 10.

A home mark 24 (see FIG. 2) which also may be an engraved metal bar is located on type band 10 above the row of characters 16. Home mark 24 is sensed by magnetic transducer 26 located at a fixed location adjacent the upper home mark track so as to sense the moving home mark 24 for producing home or reference pulses on line 27. Reference pulse produced by transducer 26 are amplified by amplifier circuit 28 for application to reference compensation circuit 29 which generates a sync pulse on line 30 for use in synchronizing the print control circuitry in a manner to be described subsequently. As shown, home mark 24 is aligned with the emitter mark 18 at a known position relative to reference character 25. To eliminate the effect of tolerance and edge sense errors transducers 19 and 26 are slightly offset. Actually, transducer 26 may be adjustable relative to its fixed location by a slight amount in either direction of the motion of the type band 10 for purposes of precise location of the reference pulse signal relative to the timing mark pulse produced by transducer 19.

Alternatively the transducers 19 and 26 could be vertically aligned and the reference mark 24 located between emitter marks 18 at a fixed location relative to reference character 25. In either structural arrangement, the print control circuits would operate to take the timing or scan pulse following the reference or home pulses as the true home signal to commence the synchronization process. Type band 10 could have a single reference mark 24 in which case a synchronization check could occur once per revolution of type band 10 or plural reference marks 24 could be provided in the same track for more frequent identification of the same reference character at multiple band positions which could be in each case the first character of each complete set type characters where more than one type set is provided per band. In the latter case a synchronization check could occur more than one per revolution to give a more frequent synchronization control if desired.

In the print control system of FIG. 1, print line buffer PLB 30 is a read/write memory device which stores a line of data to be printed which is received from a system interface 31 through data interface 32 on data bus 33. Data transfer can take place in any manner but preferably is serial by word parallel bit but parallel by word and parallel by bit transfers can also apply. The print data is arranged in PLB 30 by address logic 34 in the sequence in which it is to be printed in a line of data on print medium 17 by the print mechanism. Customarily PLB 30 has storage locations equal to the number of print positions of the print line. PLB 30 can be a separate storage device or can be a sector of a larger memory device partitioned for the storage of other data.

Band image buffer BIB 36 is preferably a read/write memory device in which an image of the printable characters of the type element 16 on type band 10 is stored in precisely the same arrangement as the type characters appear on type band 10. The band image data is received from system interface 31 through data interface 32 on data bus 33. The band image data is arranged in BIB 36 by address logic 37 under control of scan control logic 35 beginning with the reference character 25 (See FIG. 2) at the first storage location and continuing at successive storage location with the character data in accordance with the sequence of the characters 16 on type band 10. BIB 36 customarily has storage locations equal in number to the type elements 16 on type band 10.

For printing, scan control logic 35 receives subscan pulses from phase locked oscillator 22 on line 23 in combination with clock pulses to operate address logic 34 and 37 to perform subscan readouts of print character data from PLB 30 and type element data from BIB 36. The print control further includes a comparator 38 which compares print character data read from PLB 30 with type character data read from BIB 36. When the print data from PLB 30 coincides with the character data read from BIB 36, comparator circuit 38 applies an EQUAL pulse to hammer fire controls 39 to initiate operation of the appropriate hammer drivers 40 for hammers 11 addressed by address logic 34.

As previously mentioned, correct printing requires synchronization between the characters on type band 10 and the character signals read from BIB 36 by address logic 37. More precisely, the characters read from BIB 36 by address logic 37 for each subscan must correspond to the characters of type element 16 alignable with the print hammers 11.

Correct printing requires synchronization between band 10 and BIB 36. More correctly, synchronization requires the type character signals being read from BIB 36 to comparator 38 to coincide with the characters of the type element 16 on band 10 as they become alignable with print hammers 11. Synchronization in accordance with this invention is obtained by determining the coincidence of the character signal for reference character 25 (see FIG. 2) from BIB 36 and the reference or true home pulse on line 43 from home pulse compensation circuit 29. In the printer system illustrated in FIG. 1, the sync check circuit 41 is connected to address bus 42 to receive address data from address register 37. Since the address of the reference character in BIB 36 is known, e.g. 0000, sync check circuit 41 operates to check the reference character address instead of the reference character signal directly with the true home pulse on line 43 from home pulse compensation circuit 29. The results of the sync check by circuit 41 are communicated on line 46 to the data interface 32 whereupon printing can be initiated if the sync was done prior to printing or suspended or allowed to continue dependent on the results of the sync check. For operating at different speeds, the printer system of FIG. 1 supplies speed control data through data interface 32 and via data bus 33 and 47 to band motor speed control 15. The speed control data could be digital data and motor speed control 15 could include digital to analog decode means which produces an analog signal for adjusting the DC voltage level applied to DC motor 14. Home pulse compensation data in accordance with this invention is supplied through data interface 32 on data bus 33 to AND circuit 45. A load command from data interface 32 on line 44 gates the compensation data through AND circuit 45 to the home pulse compensation circuit 29 where it is stored and used to generate true home pulses on line 43 in response to home pulse from transducer 26 on line 27 as amplified by amplifier circuit 28 in combination with PSS timing pulses on line 23 from the phase locked oscillator circuit 22. Thus with this arrangement, speed changes can be made without operator interference and without requiring substitution of logic circuits or mechanical devices.

Before describing the details of the home pulse compensation circuitry 29 and the sync check logic 41, a general discussion of the underlying principles of operation of a multi-speed printer as it affects synchronization of the print controls is presented. Referring to FIG. 2 the home pulse mark 24 is sensed by reference transducer 26 and a reference pulse generated on line 27 when reference character 25 is located at a lead distance S in advance of a given print hammer position, e.g. PRINT HAMMER No. 1, which has a predetermined flight time. The lead distance S is defined by the expression, $S = V \cdot T_F$ where V is the speed of type band 10 and $T_F$ is the time of flight of PRINT HAMMER No. 1. The lead distance S in this equation represents the distance the reference character 25 will travel at a given speed V for given flight time interval $T_F$ to arrive at the given print position of PRINT HAMMER No. 1. For a single speed printer, lead distance S is essentially constant and the reference position of transducer 26 remains substantially fixed. For multi-speed printer operation, however, the lead distance S for a given reference character and print hammer position for a fixed flight time the lead distance S is a variable. This is shown in FIG. 2 where $S_H$, $S_M$, $S_L$, represent the lead distances for high, medium and low speeds respectively of type band 10. 26A and 26B represent the corresponding locations which transducer 26 would be required to assume in order that the reference pulse occur at the correct lead time for $S_M$ and $S_L$. As shown for the three lead distances in FIG. 2, the speeds $S_H$, $S_M$, $S_L$ all correspond to a whole number of timing marks 18. However, in certain printing applications it may be desirable to select operating speeds where the lead time does not correspond to an integer number of timing marks and synchronization as previously practiced which counts emitter or timing marks would be inadequate to properly time the synchronization check circuitry 41.

Figure 3A:
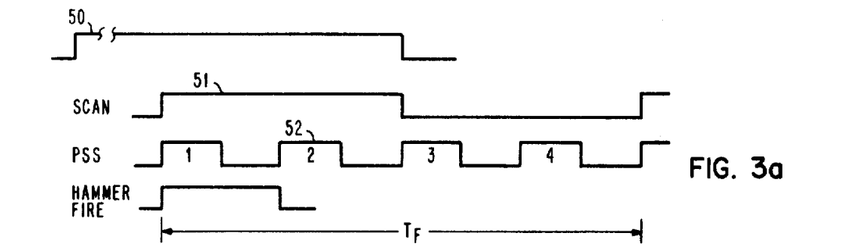
FIGS. 3a, b and c are timing charts showing timing and reference signals generated at different speeds for a printer system utilizing the arrangement shown in FIG. 2.
Figure 3B:
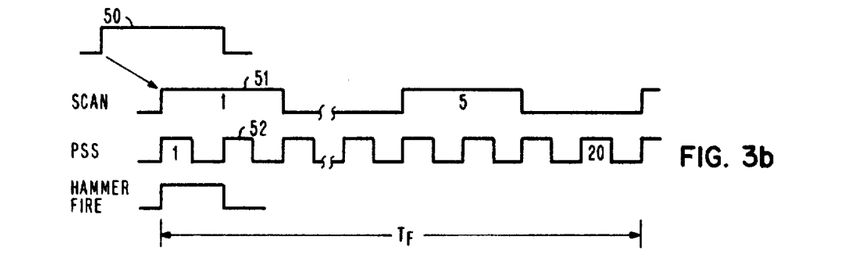
Figure 3C:
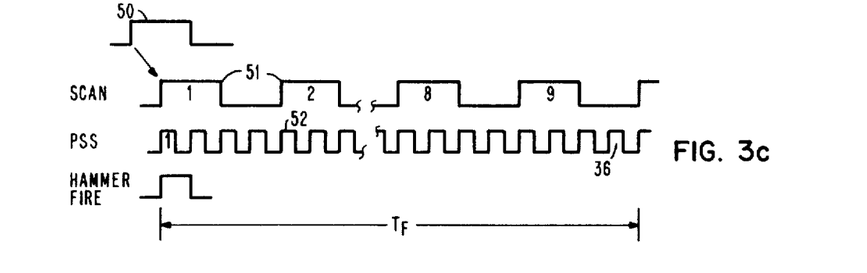

As shown in FIG. 1, the home pulse compensation circuit 29 operates to receive a home pulse and PSS or subscan pulses for generating a compensated TRUE HOME pulse. FIG. 3a–c illustrate the timing of the home scan and subscan for the three speeds with the corresponding lead times shown in FIG. 2. As seen in FIG. 3c for the high speed operation, home pulse 50 is generated slightly ahead of timing mark or scan pulse 51. Subscan pulses PSS 52 occurring at the rate of four PSS pules 52 for each scan pulse are generated for the flight time interval $T_F$. As shown in FIG. 3c for high speed operation the number of scan pulses 51 is nine and the number of PSS pulses is thirty six. FIG. 3b shows for the medium speed scan pulses 51 at rate of five for the flight time interval $T_F$ and PSS pulses 52 at the rate of twenty. FIG. 3a shows for low speed scan pulses 51 during the flight time interval $T_F$ occurring at the rate of one, whereas the PSS pulses 52 occur at the rate of four. Stated in another way, the number of timing pulses for the three different speeds is a variable and this provides the basis for performing home pulse compensation in accordance with this invention. Other speeds may be chosen in which the number of scan pulses is a fraction, however the number of subscan pulses is an integer number due to the fact that the PSS pulses occur at a higher frequency rate.

Figure 4:
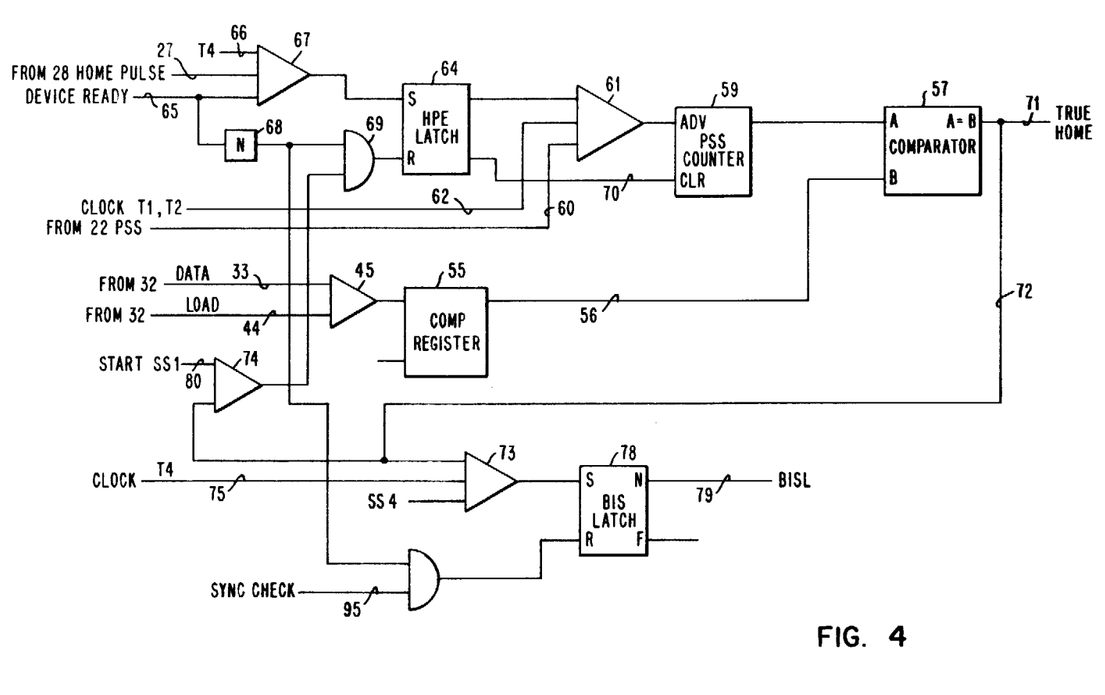
FIG. 4 is a detail circuit diagram showing the home pulse compensation circuitry of the print control system of FIG. 1.

As seen in FIG. 4, the home pulse compensation circuitry comprises comp register 55 which stores count values (in subscan increments). As previously described, the count values are loaded under program control from data bus 33 via load command on line 44 through AND circuit 45. The count value stored in comp register 55 is applied on bus 56 to the B input of comparator 57. The A input of comparator 57 is connected by bus 58 to the output of PSS counter 59. PSS pulses from PLO 22 (see FIG. 1) on line 60 are gated through AND circuit 61 to the ADV input of PSS counter 59 by clock pulses $T_1 \cdot T_2$ on line 62 and by the line 63 being raised when home pulse extend HPE latch 64 is set. The home pulse on line 27 and a device ready signal on line 65 gate a clock pulse T9 on line 66 through AND circuit 67 connected to the S input of HPE latch 64. The device ready signal would come on for example when the type band 10 is up to speed and remains on so long as that condition is satisfied. An inverter 68 is connected to line 65 and to OR circuit 69 to the reset of latch 64. When the device ready signal goes down on line 65, HPE latch 64 is reset which applies a signal on line 70 to the CLR input of PSS counter 59.

When the count registered in PSS counter 59 equals the delay count value in comp register 55, comparator 57 generates a TRUE HOME signal at its A=B output on line 71. The output of comparator 57 is connected by line 72 to the inputs of AND circuit 73 and 74 respectively. A TRUE HOME pulse on line 72 is gated through AND circuit 73 by a T4 clock pulse on line 75 along with an SS4 pulse on line 76. The SS4 signal is provided by a four stage ring counter for example which can be part of the scan control 35 of FIG. 1 which indicates the last subscan for each scan. Thus when the T4 clock pulse on line 75 is gated through AND circuit 73, the band in sync BIS latch 78 is set applying a band in sync BISL signal on line 79. The TRUE HOME pulse signal from comparator 57 on line 72 is also applied through OR circuit 69 to the R input of the HPE latch by a start SS1 pulse on line 80 of AND circuit 74. When reset, HPE latch 64 raises the F output and applies a clear signal on line 70 to the PSS counter 74 clearing it to the initial count condition whereby comparator 57 then drops the TRUE HOME pulse on lines 71 and 72.

Figure 5:
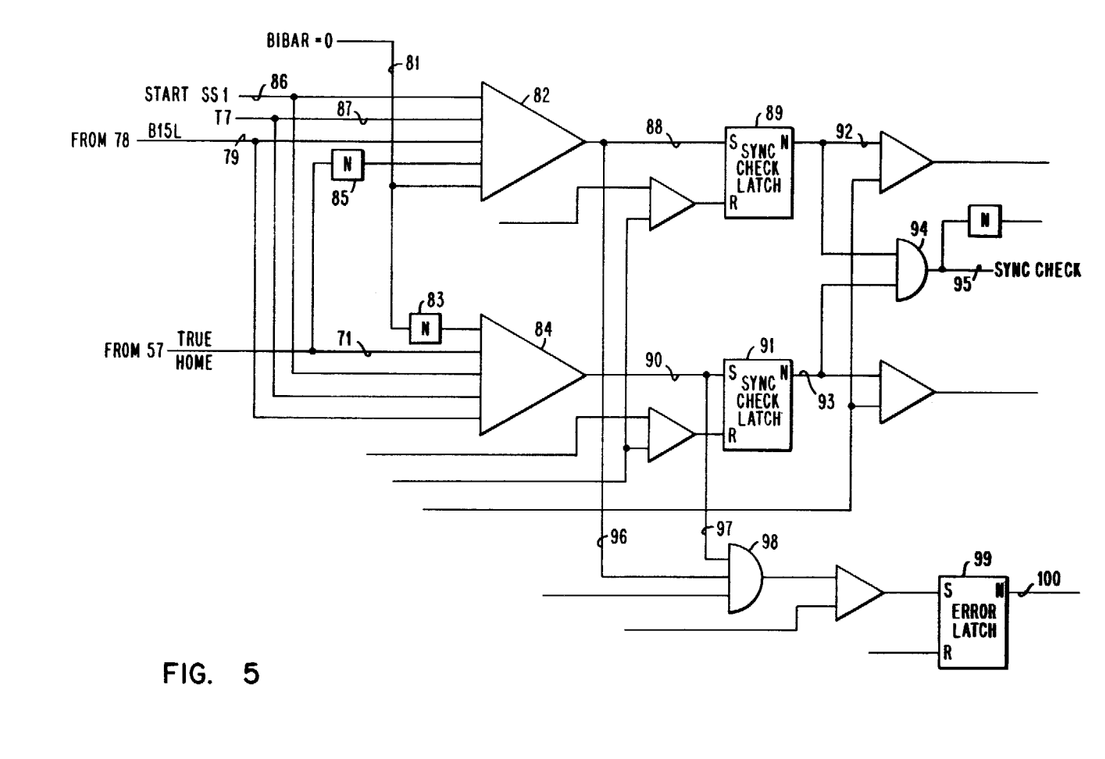
FIG. 5 is a detail circuit diagram of the sync check portion of the printer system of FIG. 1.

FIG. 5 shows the sync portion of sync control 41 of FIG. 1. As previously discussed, sync checking is performed in the preferred embodiment of this invention by determining that the reference character address BIBAR from BIB register 36 and the reference pulse as modified by the home compensation circuit 29, are coincidental. As seen in FIG. 5, a BIBAR=0 signal is applied on line 81 to AND circuit 82 and through inverter 83 to AND circuit 84. A true home pulse from comparator 57 (see FIG. 4) is applied on line 71 to AND circuit 84 and through inverter 85 to the AND circuit 82. Other signals applied directly to the two AND circuits 82 and 84 are as follows.

1. Start SS1—applied on line 86. This signal sychronizes the BIB register with the subscan ring and the scan pulses from transducer 24.

2. BISL—applied on line 79. This signal remains on after TRUE HOME signal is generated and will be turned off if sync check occurs.

3. T7—this is a clock pulse which occurs during sync check time applied to line 87.

AND circuit 82 has its output connected by line 87 to the S input of sync check latch 89. AND circuit 84 has its output connected by line 90 to sync check latch 91. Sync check latch 89 and sync check latch 91 have output connections 92 and 93 respectively connected to OR circuit 94 for applying a SYNC CHECK signal on line 95 when either latch is set. AND circuits 82 and 84 have their outputs connected via lines 96 and 97 respectively through OR circuit 98 to the set input of an error latch 99. The output of latch 99 applies a signal on line 100 for indicating an out of sync or error condition.

Sync latch 89 and error latch 99 are set in the event a BISL signal is present on line 79, TRUE HOME signal is inactive on line 71 and a BIBAR=0 signal is present on line 81. Sync check latch 91 and error latch 99 are both set when TRUE HOME signal is active on input line 71 and a BIBAR=0 signal is inactive on line 81. In the event a TRUE HOME signal is present on line 71 and a BIBAR=0 signal is present on line 81, sync latches 89 and 91 and error latch 99 are not set indicating that BIB register 36 and the home pulse compensation circuitry are in synchronization.

Figure 6:
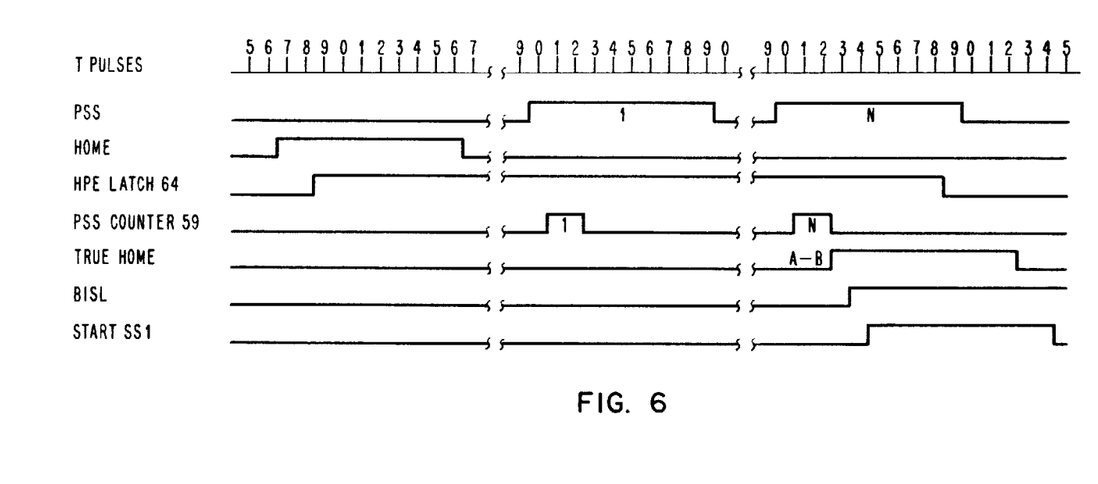
FIGS. 6 and 7 are timing charts describing the operation of the home pulse and sync check circuit diagrams of FIG. 4 and 5 respectively.
Figure 7:
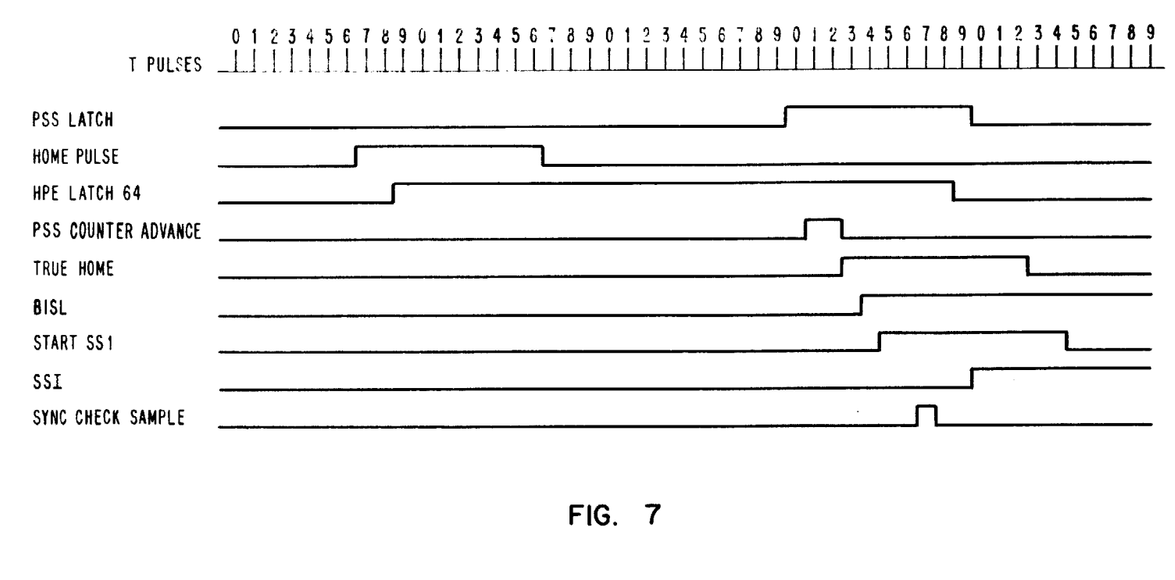

The timing for the operation of the home pulse compensation and band in sync circuitry is shown in FIGS. 6 and 7.

Figure 8:
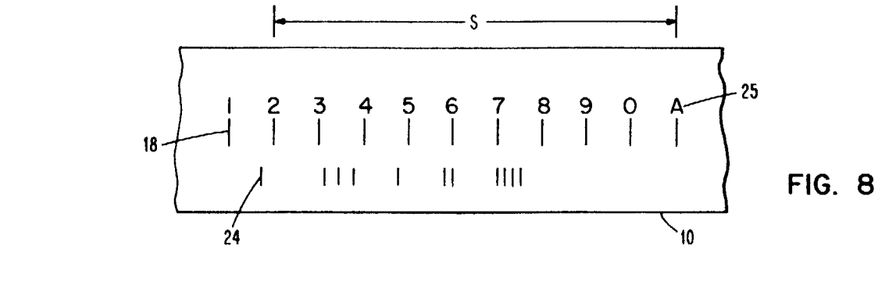
FIG. 8 is a schematic of a second embodiment of a type band fragment showing another arrangement of the timing and reference marks for practicing the invention.

FIG. 8 shows a second embodiment of a type band in which the reference mark 24 is located at a position in advance of the reference character 25. In this case the reference mark 24 leads the reference character 25 lead distance associated with the highest speed. With this arrangement the reference transducer would be located in advance of the reference character. Other arrangements of the reference mark and the reference transducer can be utilized which also use the invention. Thus versatility is provided in the practice of the invention and in any event the transducers would have a fixed location most convenient to the circumstances in which the mechanism is to be designed.

The following table illustrates a set of parameters with the appropriate count values that are used for the different operating speeds.

| Band Speed (Inches Per Second) | Travel Time For Lead Distance S | Sub-Scan Time | $TH_{DLY}$ | Count Value |
|---|---|---|---|---|
| 1000 | 1200 usec | 33 usec | 0 | 1 |
| 666 | 1800 usec | 50 usec | 600 usec | 13 |
| 333 | 3600 usec | 100 usec | 2400 usec | 25 |

Thus it will be seen that a multiple speed synchronization control has been provided which can be operated without requiring operator intervention to adjust for lead time variations, does not impose limits on the speeds of operation, can be controlled by external processor and which does not require changes in circuitry to operate at different speeds.

While the invention has been particularly shown and described with reference to preferred embodiments thereof, it will be understood by those skilled in the art that the foregoing and other changes in form and details may be made therein without departing from the spirit and scope of the invention.

We claim:

1. In a printer system wherein a printer mechanism comprises a plurality of type characters movable in a closed path and a plurality of print hammers electrically operable for engaging said type characters at print positions along said path to effect printing of said type characters on a print medium,
   drive means for producing constant motion of said type characters at a plurality of speeds relative to said print hammers whereby printing occurs at a corresponding plurality of printing rates,
   means for selectively operating said print hammers in timed relation with the motion of said type characters to effect on-the-fly printing at said plurality of print rates including
   print control means operable for providing character identifying signals including a reference character signal in synchronism with the motion of said characters at said plurality of speeds,
   means for synchronizing the operation of said print controls with said type characters during said motion at said plurality of speeds including,
   means for generating reference pulses indicative of the motion of a reference type characters relative to a reference position on said closed path located at a predetermined lead distance from a given print hammer,
   said lead distance being a fixed distance dependent on the flight time of said given print hammer to effect engagement with said reference character when moving at one of said speeds,
   sync control means connected to said print control means for receiving said character identifying signals,
   said sync control being operative for determining the coincidence of said reference character signal from said print control and said reference pulses, and
   compensating circuit means connected between said reference pulse generating means and said sync control means,
   said compensating circuit means having adjustment means operable for electrically modifying the timing of said reference pulses for application to said sync control means,
   said adjustment means being operable for modifying the timing of said reference pulses in accordance with changes in said speed of said type characters by said drive means from said one of said constant speeds.

2. In a printer system in accordance with claim 1 in which
   said plurality of constant speeds includes a high speed and at least one lower speed,
   said one constant speed being said high speed, and
   said compensating circuit means comprises delay circuit means connected to receive said reference pulses from said reference pulse generating means,
   said delay circuit means being adjustable for modifying the timing of said reference pulses for said lower speed.

3. In a printer system in accordance with claim 2 in which
   said delay circuit means is a programmable means for modifying the timing of said reference pulses.

4. In a printer system in accordance with claim 3 in which
   said means for synchronizing the operation of said print control means includes timing means associated with said moving type characters for generating timing pulses in sychronism with the motion of said type characters, and
   said delay circuit means is operable for modifying the timing of said reference pulses in response to a predetermined number of said timing pulses associated with said plurality of speeds.

5. In a printer system in accordance with claim 4 in which
   said type characters and said plurality of print hammers have a pitch differential whereby
   said characters and said print hammers are alignable in scan and subscan sequences,
   said timing means associated with said moving type characters include means for generating scan and subscan timing signals in synchronism with the motion of said type characters, and said delay circuit means is operable for modifying the timing of said reference pulses for counting a predetermined number of said subscan pulses in response to said reference pulses,
   said predetermined number or said subscan pulses being variable in proportion to changes of said type character speed from said constant speed.

6. In a printer system in accordance with claim 5 in which
   said delay circuit means comprises counter means operable in response to said reference pulses from said reference pulse generating means for counting said timing pulses,
   storage means for storing a count value representing the number of timing pulses required for delaying the reference pulses at said plurality of speeds, and comparison means connected to said counter means and to said storage means for supplying a true home pulse signal to said sync control means when said count registered in said count means corresponds to said count value in said storage means.

7. In a printer system in accordance with claim 6 in which
said storage means comprises a register means which is electrically alterable for storing a first count value for said higher speed and a second count value for said at least one lower speed.

8. In a printer system in accordance with claim 7 in which
said print mechanism comprises an endless flexible type band,
said type characters are uniformly spaced in a single row on said flexible type band,
said drive means includes spaced pulleys for revolving said type band whereby said type characters move in said closed path at said plurality of speeds,
said timing means comprises a row of timing marks fixed on said band,
said timing signals being in alignment with and spaced equally with said plurality of type characters, and
said first means for generating scan signals comprises stationary transducer means for sensing said timing marks during revolution of said type band by said drive means at said plurality of speeds, and
said drive means includes motor means operable for driving said pulleys at said plurality of speeds.

* * * * *